United States Patent
Andersson et al.

(10) Patent No.: US 10,196,941 B2
(45) Date of Patent: Feb. 5, 2019

(54) EXHAUST GAS SYSTEM

(71) Applicant: VOLVO TRUCK CORPORATION, Göteborg (SE)

(72) Inventors: Lennart Andersson, Varberg (SE); Arne Andersson, Mölnlycke (SE); Peter Mårdberg, Västra Frölunda (SE)

(73) Assignee: Volvo Truck Corporation, Göteborg (SE)

( * ) Notice: Subject to any disclaimer, the term of this patent is extended or adjusted under 35 U.S.C. 154(b) by 34 days.

(21) Appl. No.: 15/319,765

(22) PCT Filed: Jun. 26, 2014

(86) PCT No.: PCT/EP2014/001742
§ 371 (c)(1),
(2) Date: Dec. 17, 2016

(87) PCT Pub. No.: WO2015/197086
PCT Pub. Date: Dec. 30, 2015

(65) Prior Publication Data
US 2017/0138221 A1 May 18, 2017

(51) Int. Cl.
*F01K 13/02* (2006.01)
*F01N 3/20* (2006.01)
(Continued)

(52) U.S. Cl.
CPC .............. *F01K 13/02* (2013.01); *B60K 28/14* (2013.01); *F01K 5/00* (2013.01); *F01K 23/065* (2013.01);
(Continued)

(58) Field of Classification Search
CPC ... F01K 13/02; F01K 3/02; F01N 5/02; F02G 5/02; B60K 28/14
See application file for complete search history.

(56) References Cited

U.S. PATENT DOCUMENTS

| | | | |
|---|---|---|---|
| 8,206,470 B1 * | 6/2012 | Jacobson | F02M 43/00 44/387 |
| 2012/0198839 A1 * | 8/2012 | Nelson | F01N 5/02 60/605.1 |

(Continued)

FOREIGN PATENT DOCUMENTS

| | | |
|---|---|---|
| DE | 102009003850 A1 | 11/2010 |
| EP | 2098696 A1 | 9/2009 |

(Continued)

OTHER PUBLICATIONS

International Search Report (dated Nov. 17, 2014) for corresponding International App. PCT/EP2014/001742.

*Primary Examiner* — Patrick Maines
(74) *Attorney, Agent, or Firm* — WRB-IP LLP

(57) ABSTRACT

An exhaust gas system includes an arrangement for conveying an exhaust gas stream and a thermodynamic engine connected to the exhaust gas stream conveying arrangement for recovery of heat from the exhaust gas stream. The thermodynamic engine includes a working fluid circulation circuit. The exhaust gas system includes at least one working fluid release arrangement which is connected between the working fluid circulation circuit and the exhaust, gas conveying arrangement for releasing the working fluid from the working fluid circulation circuit to the exhaust gas conveying arrangement. The exhaust gas stream conveying arrangement includes at least one exhaust gas treatment unit. Further, the working fluid release arrangement is connected upstream of or directly to the exhaust gas treatment unit.

24 Claims, 15 Drawing Sheets

(51) Int. Cl.
  *F01N 5/02*    (2006.01)
  *F02G 5/02*    (2006.01)
  *F01N 3/02*    (2006.01)
  *F01K 5/00*    (2006.01)
  *B60K 28/14*   (2006.01)
  *F01K 23/06*   (2006.01)

(52) U.S. Cl.
  CPC ......... *F01N 3/0205* (2013.01); *F01N 3/2066* (2013.01); *F01N 5/02* (2013.01); *F02G 5/02* (2013.01); *F01N 2610/02* (2013.01); *F01N 2610/1406* (2013.01); *F01N 2610/146* (2013.01); *F01N 2610/148* (2013.01); *F01N 2610/1466* (2013.01); *F01N 2610/1486* (2013.01); *Y02T 10/16* (2013.01); *Y02T 10/166* (2013.01); *Y02T 10/24* (2013.01)

(56) References Cited

U.S. PATENT DOCUMENTS

2013/0139766 A1\* 6/2013 Lombard ................ F01K 17/04
                                                   123/41.01
2017/0122169 A1\* 5/2017 Ettireddy .............. F01N 3/2013

FOREIGN PATENT DOCUMENTS

| EP | 2357349 A1 | | 8/2011 | |
|---|---|---|---|---|
| EP | 2360355 A1 | | 8/2011 | |
| WO | 2012025776 A1 | | 3/2012 | |
| WO | WO 2012025776 A1 | \* | 3/2012 | ............. F01K 17/04 |
| WO | 2012096958 A1 | | 7/2012 | |

\* cited by examiner

EXHAUST GAS SYSTEM

BACKGROUND AND SUMMARY

The invention relates to an exhaust gas system, such as for an internal combustion engine and especially for a diesel engine. The invention can be applied in vehicles and especially in heavy-duty vehicles, such as trucks, buses and construction equipment. Although the invention will be described with respect to a truck, the invention is not restricted to this particular vehicle, but may also be used in other vehicles. The invention further relates to a vehicle comprising the exhaust gas system for recuperation of waste heat of an internal combustion engine comprised in the vehicle.

The exhaust gas system comprises an arrangement for conveying an exhaust gas stream. The arrangement for conveying an exhaust gas stream may comprise an exhaust after treatment system. The exhaust gas system further comprises a thermodynamic engine connected to the exhaust gas stream conveying arrangement for recovery of heat from the exhaust gas stream. The thermodynamic engine comprises a working fluid circulation circuit.

More specifically, the thermodynamic engine is configured for converting thermal energy of a gaseous phase working fluid into kinetic energy, and may be constituted by a Rankine cycle engine.

According to the state of the art, it is known to use such thermodynamic engines, particularly Rankine cycle engines, for recuperation of waste heat of internal combustion engines. As commonly known, a Rankine cycle engine is an engine that converts heat into work. The heat is applied externally to a preferably closed working fluid circuit which may use water or other suitable liquids as working fluids. A pump is used to pressurize the liquid working fluid received from a condenser which is then heated and thereby converted into its gaseous phase. Subsequently, the gaseous working fluid is transported to a steam engine, where the thermal energy is convened to kinetic energy. In a further step the gaseous working fluid is converted back to its liquid phase in the condenser.

A common working fluid is water as it is easy to supply, already present on a vehicle and harmless to the environment. Even if water has some attractive properties, it also has some drawbacks.

For example, water freezes at 0° C and if the steam is mixed with air, the functionality of the steam engine drops. Additionally, small amounts of air in the steam can be rather aggressive to the construction material.

For avoiding air accumulating in the steam it has been suggested to keep the pressure in the working fluid above ambient air pressure. Disadvantageously, this results in a constraint in the efficiency, since the condensing temperature needs to be relatively high (particularly above 100 degree Celsius). However, during a longer standstill (night, weekend, etc.) it is difficult to avoid a pressure drop below ambient pressure in the system, which in turn results in air leaking into the system.

Further, in some designs it is even preferred to have lower pressure than ambient pressure in some parts of the Rankine cycle for a good efficiency.

For solving the freezing problem, it has been suggested to mix the water with small amounts of ammonia or alcohol, so that the freezing point is lowered. Additionally, ammonia or alcohol also lowers the dewpoint so that the condensing can be performed at lower temperatures.

Disadvantageously, ammonia is both caustic and hazardous. Therefore, ammonia has to be handled with great care and should not be released to the environment. However, such a release is necessary for instance in case of an accident involving the thermodynamic engine or a vehicle comprising such an engine (e.g. a collision of the vehicle with another vehicle) or during maintenance of the thermodynamic engine and/or of the vehicle. Up to now, a bypass of the expander device is used for releasing the pressure in the working fluid and providing safe maintenance possibilities. Disadvantageously, this procedure is very time consuming so that stand-still, periods of the vehicle in a workshop are unnecessarily prolonged and/or waiting times for safe access to a vehicle, for e.g., a rescue team, are unacceptable long.

It is desirable to provide an exhaust gas system, which is useable for recovering waste heat from an internal combustion engine which provides a safe release possibility of the working fluid to the environment.

Accordingly, an exhaust gas system is provided comprising an arrangement for conveying an exhaust gas stream and a thermodynamic engine connected to the exhaust gas stream conveying arrangement for recovery of heat from the exhaust gas stream. The thermodynamic engine comprises a working fluid circulation circuit. The exhaust gas system comprises at least one working fluid release means, which is connected between the working fluid circulation circuit and the exhaust gas conveying arrangement for releasing the working fluid from the working fluid circulation circuit to the exhaust gas conveying arrangement. More specifically, the exhaust gas stream conveying arrangement comprises at least one exhaust gas treatment unit and the working fluid release means is connected upstream of or directly to the exhaust gas treatment unit.

Thereby, the working fluid release means creates conditions for releasing at least part of the working fluid to the exhaust gas treatment unit which renders the working fluid harmless to the environment. The working fluid release means may alternatively be called venting means.

Further, the exhaust gas system creates conditions for reducing the air accumulation tendency of the thermodynamic engine due to ambient air leaking into the system.

Advantageously, thereby a safe release of the working fluid is possible. The exhaust gas system creates conditions for a quick and safe pressure relief Additionally, by providing a safe release, the use of ammonia is possible, so that at least freezing of the working fluid at cold, temperatures may be avoided.

Additionally, the thermodynamic engine can easily be purged from accumulated air. If additionally a working fluid is used which is already present in the exhaust gas system, the overall parts in the system can be reduced, which in turn is cost- and space efficient. In the application of a vehicle, it would increase the load capacity.

Preferably, a catalytically working treatment unit is used. According to a preferred embodiment, the exhaust gas treatment unit is formed by a selective catalytic reduction unit (SCR) using ammonia for reducing a NOx amount of the exhaust gas.

In other words, the working fluid is not released directly to the atmosphere but to a catalytic treatment unit which converts the working fluid to harmless compounds, in a preferred application, such a catalytic treatment is provided by the exhaust gas after treatment system of a vehicle equipped with an internal combustion engine. The synergistic effects provided thereby allow for a system which provides a release of working fluid without problems as well as a recuperation of waste energy of the internal combustion engine.

As mentioned above, the exhaust gas after treatment system may convert hazardous working fluids into harmless compounds. Particularly, the use of ammonia, preferably in form of urea, is advantageous as ammonia may be used as reduction agent in the exhaust gas after treatment system and can also be used as working fluid for a thermodynamic engine. Thereby, the overall number of parts at the vehicle can be reduced.

Using ammonia has the further advantage that surplus ammonia from the working fluid circuit can be used in the exhaust gas after treatment system, particularly the SCR unit. Thereby no extra reservoir for collecting surplus ammonia needs to be provided.

According to a further preferred embodiment, the thermodynamic engine comprises a condensation device positioned in the working fluid circulation circuit and the working fluid release means is connected to the condensation device at a gas side thereof. Advantageously, thereby accumulated air may be removed from the condensation device, whereby in turn malfunctions of the condensation device and/or of other parts of the thermodynamic engine are avoided.

According to a further preferred embodiment, the thermodynamic engine further comprises a heating device for heating the working fluid and thereby converting a liquid working fluid to the gaseous phase working fluid. Especially, the heating device of the thermodynamic engine is formed by a heat exchanger positioned in the exhaust gas stream for exchanging heat between the exhaust gas stream and the working fluid of the thermodynamic engine. This creates conditions for recovery of heat from the exhaust gas stream by means of the thermodynamic engine.

According to a farther development, the heating device of the thermodynamic engine is arranged downstream of the exhaust gas after treatment unit in the exhaust gas stream. For not cooling the exhaust gas before the exhaust gas has entered the exhaust gas after treatment system and thereby compromising the efficiency of the exhaust gas after treatment system, the heat exchanger is preferably arranged downstream of the exhaust gas after treatment system.

According to a further preferred embodiment, the working fluid release means is connected to the working fluid circuit downstream of the heating device and upstream of a gas liquid interface in the condensation device. Preferably, the working fluid release means is connected to the working fluid circuit also upstream of the expander device. Under certain circumstances, at the high pressure side, namely upstream of the expander, the pressure of the working fluid may become too high so that a release of the working fluid is necessary. Since the pressure of the working fluid upstream of the expander unit is usually higher than the pressure in the exhaust gas duct, additional propelling means for transporting the working fluid to the exhaust gas duct are not required.

According to a further preferred embodiment, the thermodynamic engine further comprises a pump device for circulating the working fluid; an expander device for converting thermal energy of the gaseous phase working fluid into kinetic energy; and that the condensation device is arranged downstream of the expander device for cooling and thereby converting the gaseous phase working fluid into the liquid phase.

According to a further preferred embodiment, the working fluid release means comprises a connecting duct and at least one release valve for controlling opening and/or closing of the connecting duct. This valve may be an On-Off valve which is normally closed, but it can also be any other suitable valve, e.g. a valve with variable inner diameter for gradually controlling the amount of working fluid streaming through of the working fluid circuit.

According to a further preferred embodiment, the exhaust gas system comprises a control unit, which is operatively connected to the release valve for opening and/or closing the valve.

According to a further preferred embodiment, the exhaust gas system comprises at least one pressure detector arranged in the working fluid circuit and that the control unit is operatively connected to the, pressure detector for controlling the opening and/or closing of the release valve in dependence on a detected pressure. By controlling the valve in dependence of the detected pressure, the pressure in the working fluid circuit can be controlled and safety compromising situations, such as over-pressure in the working fluid circuit, can be avoided. Preferably, the pressure detector is arranged downstream of the heating device and upstream of a gas-liquid interface in the condensation device. Further preferably, the control unit is configured to open the release valve if a pressure exceeding a pressure threshold is detected by means of the pressure detector.

Since safety compromising pressure situations mostly appear at the high pressure side of the working fluid circuit and particularly upstream of the expander unit, detecting and controlling the valve in dependence of the pressure upstream of or at the expander device is advantageous.

According to a further preferred embodiment, the exhaust gas system comprises at least one air sensor fir detecting air in the working fluid circuit, that the control unit is operatively connected to the air sensor for opening the valve upon detection of air accumulation in the working fluid circuit. Alternatively or additionally, the control unit may be operatively connected to a collision warning system, detecting a potential collision, and/or a collision detection unit, detecting a collision, for opening the venting valve upon detection of a risk for a collision or a collision.

According to a further preferred embodiment, the exhaust gas system comprises a manually operable means, which is connected to the control unit for manually controlling opening and/or closing of the valve.

Advantageously, in a safety compromising situation, such as a collision for instance of the vehicle comprising such a thermodynamic engine, the working fluid may be released instantaneously so that a non-hazardous access to the vehicle is possible. The manual release possibility even provides a higher safety since in case the control unit is damaged a release of the working fluid is still possible.

According to a further preferred embodiment, the exhaust gas system comprises a working fluid storage tank fluidly connected to the working fluid circuit for storing liquid working fluid. Preferably, the working fluid storage tank is fluidly connected to a low pressure side of the working fluid circuit. The working fluid storage tank is preferably configured for providing liquid working fluid to the working fluid circuit by means of a supply duct. Further preferably, the thermodynamic engine comprises a condensation device positioned in the working fluid circulation circuit and the working fluid storage tank is connected to the working fluid circuit downstream of the condensation device and upstream of the heating device. Due to working fluid leakage during normal operation and due to a potential release of working fluid through the venting means, replacement of working fluid in the working fluid circuit may be required. By the virtue of energy saving reasons, the working fluid is preferably supplied in its liquid phase to the low pressure side of the working fluid circuit.

Preferably, the working fluid storage tank is fluidly connected to a high pressure side of the working fluid circuit. Especially, the exhaust gas system comprises a working fluid storage tank valve configured to control working fluid flow between the working fluid storage tank and the working fluid circuit. Further preferably, the exhaust gas system comprises a control unit and that the working fluid storage tank valve is connected to the control unit in order to open if a pressure below ambient air pressure is detected in the working fluid circuit.

According to a further preferred embodiment, the working fluid release means comprises a first connection duct fluidly connecting the low pressure side of the working fluid circuit to the working fluid storage tank and a second connection duct connecting the working fluid storage tank to the means providing ambient air pressure preferably to the exhaust gas side of die internal combustion engine. Thereby, the amount of working fluid emitted into the exhaust gas may be reduced as the gaseous working fluid condenses in the cool liquid working fluid of the storage tank and only accumulated air is transported off to the exhaust gas duct. Consequently, the working fluid storage tank can be made smaller and/or requires less frequent refills.

Preferably, the working fluid may be water and/or ammonia, and/or more generally a mixture of a first component and a second component, wherein preferably the first component is water and the second component is an antifreeze component, such as ammonia, alcohol or a mixture thereof. According to a thither preferred embodiment, the working fluid comprises an antifreeze component, such as ammonia and/or alcohol, such as ethanol. Using alcohol, ammonia and/or a mixture of alcohol or ammonia with water lowers the freezing point, whereby an anti-freeze protection for the thermodynamic engine is provided. The use of ammonia has the additional advantage that ammonia may already be present in a vehicle, preferably in the form of urea, as reduction agent for the reduction of NOx in the exhaust gas aftertreatment system thus provision of additional tanks or reservoirs may be avoided.

It is also desirable to provide an exhaust gas system, which creates conditions for working properly in different environments, especially in different climates.

Accordingly, an exhaust gas system is provided comprising a thermodynamic engine, wherein the thermodynamic engine comprises a working fluid circulation circuit, wherein the working fluid comprises an antifreeze component. Further, the exhaust gas system comprises at least one reservoir for the antifreeze component, wherein the at least one reservoir is fluidly connected to the working fluid circuit for regulating a concentration of the antifreeze component of the working fluid in the working fluid circuit. The reservoir for the antifreeze component provides the possibility to increase and/or decrease the concentration of antifreeze component in the working fluid circuit.

According to a preferred embodiment, the exhaust gas system comprises an arrangement for conveying an exhaust gas stream and the thermodynamic engine is connected to the exhaust gas stream conveying arrangement for recovery of heat from the exhaust gas stream. Preferably, the exhaust gas stream conveying arrangement comprises an exhaust gas after treatment unit. Especially, the exhaust gas after treatment unit and the thermodynamic engine are connected to the same ammonia reservoir. Since ammonia can he used for the SCR unit as well gas for the working fluid circuit only one ammonia reservoir and thereby only one additional tank is necessary. Additionally, the SCR unit may serve as ammonia storage for storing ammonia released from the working fluid circuit. This reduces, the overall parts of the vehicle and facilitates refilling of the various tanks. Further preferably, the exhaust gas treatment unit is formed by a selective catalytic reduction unit (SCR) using ammonia for reducing a NOx amount of the exhaust gas.

According to a further preferred embodiment, the exhaust gas system comprises a connection duct, which connects the reservoir and the working fluid circulation circuit and/or a valve for regulating a concentration of the antifreeze component of the working fluid in the working fluid circuit. Preferably, the exhaust gas system comprises a controller configured to control the concentration of the antifreeze component by opening and/or closing the reservoir valve in accordance to a local climate zone and/or a sensed ambient temperature.

In case the second component serves as anti-freeze component or generally has influence on the phase transition points of the working fluid, this increase and/or decrease of the concentration of the second component in the working fluid may be triggered by the local climate and/or a sensed ambient temperature. Advantageously, at cold temperatures a high concentration of the second component can be used as anti-freeze protection so that an increased amount of the second component during cold temperatures, i.e. during wintertime, is provided, wherein at higher temperatures a lower concentration is provided so that the condenser can operate at higher temperatures.

Preferably, the concentration of the second component can be adapted on a daily, weekly and/or a monthly basis depending on the expected temperature variations. Of course it is also possible to adapt the concentration of the second component on a shorter time scale or an even longer time scale.

In case the reservoir or the working fluid storage tank is connected to the working fluid circuit upstream of the expander device, supply of an additional amount of working fluid or a additional amount of the second component to the working fluid during shutdown of the combustion engine may prevent air from leaking into the working fluid circuit. Preferably this supply takes place if a pressure below ambient pressure is detected at the nigh pressure side of the circuit so that the additional amount of working fluid may compensate the pressure drop.

In case ammonia is used as second component or working fluid, the reservoir or the working fluid storage tank may be adapted to be heated to a temperature where the ammonia in the reservoir/tank has a pressure above ambient air pressure and/or above the pressure in the working fluid circuit at the connection of the reservoir/tank. This has the advantage that no additional pump is necessary for propelling flow of ammonia, from the ammonia reservoir/tank to the working fluid circuit.

According to a further preferred embodiment, the ammonia reservoir is adapted to store liquid ammonia and/or an ammonia adsorbing material, preferably CaC and/or MgCI2 and/or SRCI2 an ammonia compound preferably urea, ammoniumcarbamate and/or ammoniumcarbonate. Preferably, ammonia adsorbing materials or ammonia compounds are used since working with liquid ammonia calls for additional safety precautions.

According to a further preferred embodiment, the exhaust gas system comprises at least one collecting reservoir, which is connected to the working fluid circuit for collecting working fluid released from the working fluid circuit.

Advantageously, the second component, which has been supplied to the working fluid circuit during shut down of the combustion engine and is at surplus in the working fluid circuit after restart of the combustion engine, may be collected in the collecting reservoir. By collecting the surplus second component in the collecting reservoir, the second component is not wasted and frequent refilling can be avoided.

According to a farther aspect of the invention, the thermodynamic engine is part of a heat recovery system, which is adapted to use waste heat of an internal combustion engine. Preferably, the internal combustion engine is connected to an exhaust gas duct which provides exhaust gas from the internal combustion engine to an exhaust gas after treatment system. Advantageously, at least one heating device of the thermodynamic engine is arranged at the exhaust gas duct, preferably downstream of the exhaust gas after-treatment system for heating the working fluid of the thermodynamic engine. Thereby, heat of the internal combustion engine is not wasted but used for the operation of the thermodynamic engine, whereby energy is recovered.

Preferably, for using the waste heat of the combustion engine, the heating device of the thermodynamic engine is at least one heat exchanger which uses the waste heat of the exhaust gas of the internal combustion engine as a heat source. However, it is also possible to connect at least one heat exchanger to a cooling fluid circuit of the internal combustion engine, whereby also waste heat of the combustion engine can be used. Thereby, an energy recovering system is provided which uses already existing parts of a vehicle for providing a maximum efficiency.

According to a further preferred embodiment, the working fluid release means is fluidly connected to the exhaust gas duct of the internal combustion engine, preferably upstream of the exhaust gas aftertreatment system, so that the exhaust gas aftertreatment system provides the at least one, preferably catalytic, unit for (catalytically) treating the working fluid. This embodiment has the advantage that an already existing exhaust gas aftertreatment system may be used for the, preferably catalytic,treatment of the working fluid.

Additionally or alternatively, it is also possible to use the exhaust gas aftertreatment system or at least part of it as working fluid storage, e.g. as the above mentioned collecting reservoir. Particularly, at cold temperatures the exhaust gas aftertreatment system is able to store significant amounts of ammonia, which may be used up later on for the catalytically treatment of the exhaust gas.

According to a further aspect of the invention, a vehicle is provided, which comprises an exhaust gas system according to any one of the alternatives described above, which exhaust gas system is connected to the internal combustion engine. Especially, the internal combustion engine connected to an exhaust gas duct providing a passage for an exhaust gas of the internal combustion engine to the atmosphere, wherein waste heat of the internal combustion engine is used as heat source for propelling the thermodynamic engine. Advantageously, the thermodynamic engine is at least part of a heat recovery system of the vehicle as mentioned above.

Further advantages and preferred embodiments are defined in the claims, the description and the figures.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
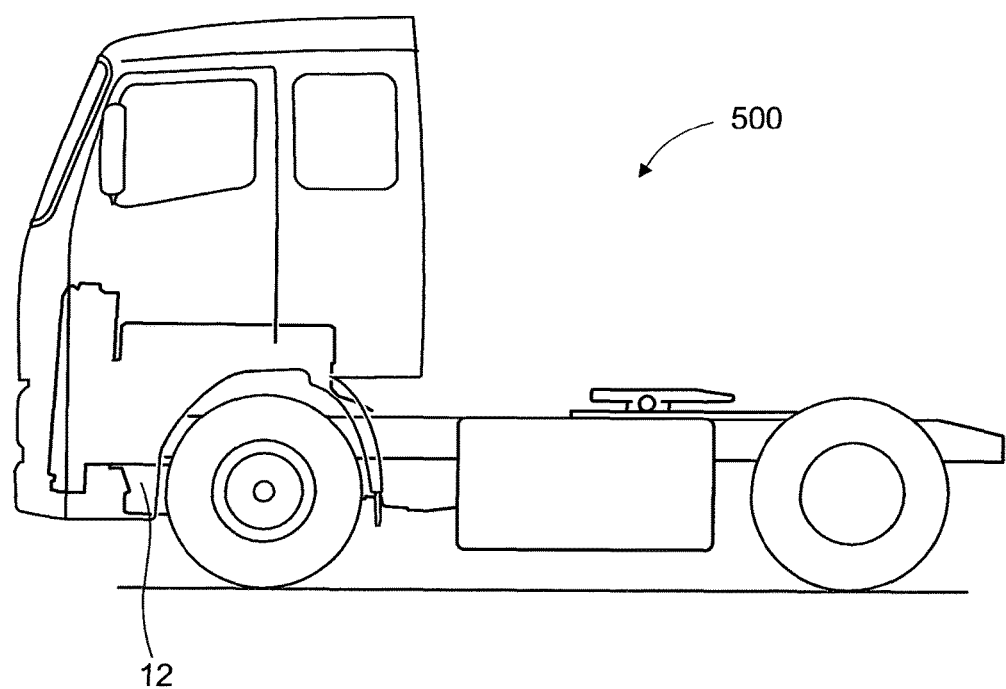
FIG. 1: a side view of a vehicle in the form of a truck, which comprises a an internal combustion engine for propelling the vehicle and a heat system.

In the following same or similar functional parts are indicated with the same reference numerals.

FIG. 1 shows a side view of a vehicle in the form of a truck 500. The truck 500 is provided with a source of motive power 12 for propelling die truck via a driveline connecting the power source to the wheels. The power source 12 is constituted by an internal combustion engine in the form of a diesel engine. It will in the following for ease of presentation be referred to as an internal combustion engine 12.

Figure 2:
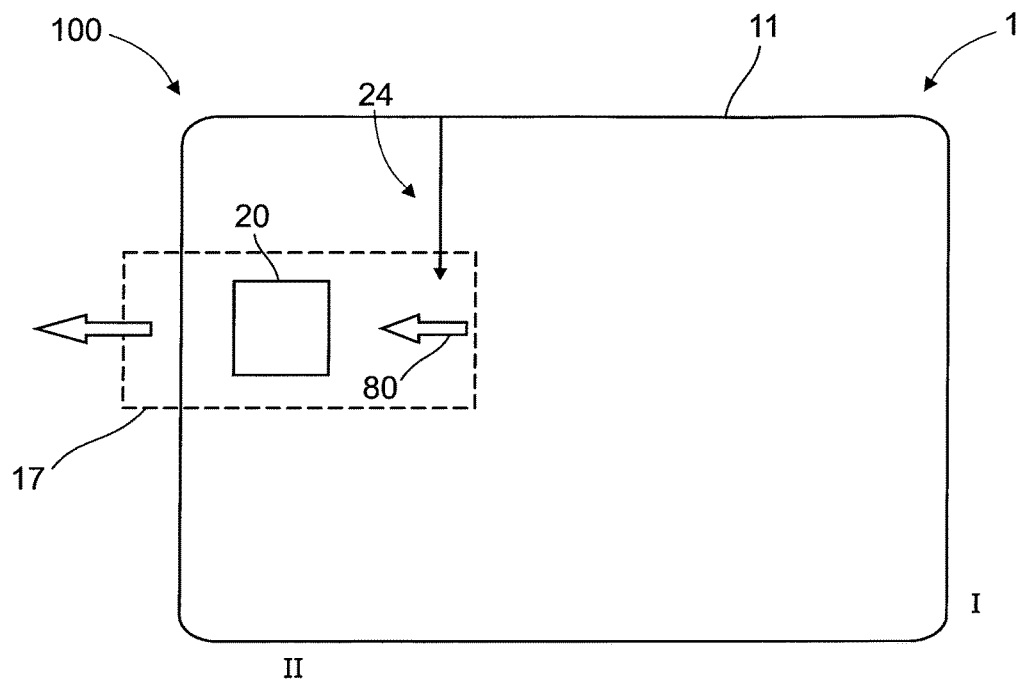
FIG. 2-17: a schematic drawing of the heat system, according to a first-sixteenth embodiment example.

FIG. 2 shows a first embodiment example of an exhaust gas system 100 preferably for being used in conjunction with the internal combustion engine 12. The exhaust gas system 100 comprises an arrangement 17 for conveying an exhaust gas stream 80. The exhaust gas stream conveying; arrangement 17 comprises at least one exhaust gas treatment unit 20. The exhaust gas treatment unit 20 is formed by a selective catalytic reduction unit (SCR) using ammonia for reducing a NOx amount of the exhaust gas.

The exhaust gas system 100 further comprises a thermodynamic engine 1 connected to the exhaust gas stream conveying arrangement 17 for recovery of heat from the exhaust gas stream 80. The thermodynamic engine 1 comprises a working fluid circulation circuit 11. The working fluid circulation circuit 11 is closed. The thermodynamic engine 1 may for example operate in accordance with a Rankine cycle.

The exhaust gas system 100 comprises at least one working fluid release means 24, which is connected between the working fluid circulation circuit 11 and the exhaust gas conveying arrangement 17 for releasing the working fluid from the working fluid circulation circuit 11 to the exhaust gas conveying arrangement 17. More specifically, the working fluid release means 24 is connected upstream of or directly to the exhaust gas treatment unit 20.

Figure 3:
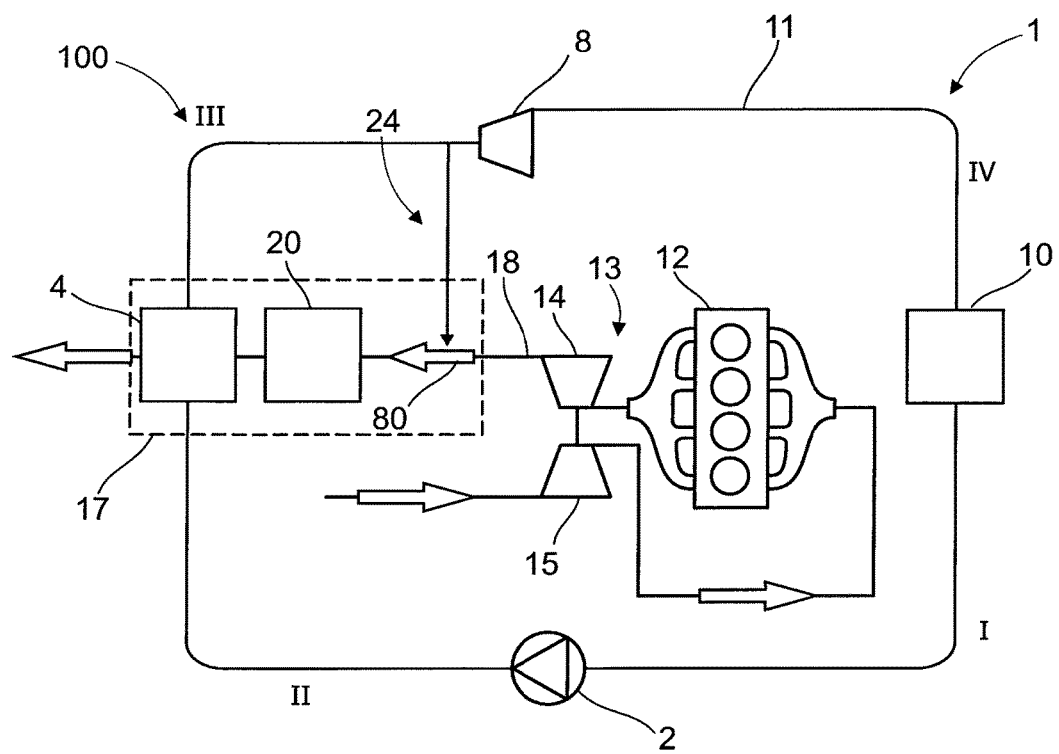

FIG. 3 shows a second embodiment example of an exhaust gas system 100, which is a further development of the first embodiment example. The exhaust gas system 100 is disclosed in conjunction with the internal combustion engine 12. More specifically, the exhaust gas conveying arrangement 17 is arranged such that it receives exhaust gases from the internal combustion engine 12. Further, the waste heat of the internal combustion engine 12 is used as heat source for the thermodynamic engine 1, wherein the thermodynamic engine forms at least part of a waste heat recovery system for the internal combustion engine.

The thermodynamic engine 1 comprises a pump device 2 for circulating the working fluid, a heating device 4 for heating the working fluid and thereby convening a liquid working fluid to the gaseous phase working fluid, an expander device 8 for converting thermal energy of the gaseous phase working fluid into kinetic energy and a condensation device 10, which are interconnected by the working fluid circuit 11. The heating device 4 is formed by a first heat exchanger, which is positioned in the exhaust gas stream 80 from the internal combustion engine 12. In other words, the first heat exchanger 4 is in heat exchanging connection to an exhaust gas side of the internal combustion engine 12.

A turbocharger 13 is arranged for charging an incoming air to the internal combustion engine 12. The turbocharger 13 comprises a turbine 14 positioned in the exhaust gas stream 80 from the internal combustion engine 12 and a compressor 15 positioned in an inlet air stream to the internal combustion engine 12. The turbine 14 and compressor 15 are rotationally rigidly interconnected via a shaft in a known way. The exhaust gas stream 80 is conveyed via an exhaust gas duct 18. Further, the internal combustion engine 12 comprises a gas intake side, where fuel and air are mixed in the known way and fed to the internal combustion engine 12.

Even if the exhaust gas treatment unit 20 is depicted as single unit in the figures it is clear for a person skilled in the art that an exhaust after treatment system may comprise a plurality of units. Preferably, the exhaust gas after treatment system comprises at least a particulate filter for removing particulates from the exhaust gas and a selective catalytic reduction unit for catalytically treating and thereby reducing the NOx amount in the exhaust gas.

The exhaust as after treatment unit 20 and the heat exchanger 4 may be integrated into a single device.

In the case of a single heat exchanger 4 in the exhaust gas stream 80, which is, arranged downstream of the exhaust gas after treatment system 20, the exhaust gas of the combustion engine 12 is not cooled before it reaches the exhaust gas after treatment system 20.

The thermodynamic engine 1 has at least four stages. In the first stage I, upstream of pump device 2, the working fluid of the thermodynamic engine 1 is in its liquid phase and has a pressure around ambient air pressure. In a second stage II, downstream of the pump device 2, the working fluid is still in its liquid phase but pressurized to a predetermined pressure by pump device 2. In the subsequent stage III downstream of the heat exchanger 4, the working fluid has been transferred into its gaseous phase and is pressurized to a predetermined pressure above ambient air pressure. In its fourth stage IV downstream of expander device 8, the working fluid is still in its gaseous phase, but has a pressure around ambient air pressure.

Therefore, the cycle can be divided in different sides (see also table 1):

A low pressure side winch is downstream of expander device 8 and upstream of the pump device 2 (stages II and III) and a high pressure side which is downstream of the pump device 2 and upstream of expander device 8 (stages I and IV); or A cold side which is downstream of the condenser device 10 and upstream of the heat exchanger 4 (stages I and II), and a hot side which is downstream of the heat exchanger 4 and upstream of the condenser device 10 (stages III ad IV).

TABLE 1

| Stage I | Stage II |
|---|---|
| Cold, Liquid phase Low pressure | Cold, Liquid phase High pressure |
| Stage IV | Stage III |
| Hot, Gaseous phase Low pressure | Hot, Gaseous phase High pressure |

In the following the working principle of the thermodynamic engine 1 will be explained. This also applies to all FIGS. 2 to 17, In the first stage I the cool liquid working fluid streams to the pump device 2, where the cool liquid working fluid is pressurized to a predetermined pressure above ambient air pressure. Then the pressurized liquid working fluid is transported to the heat exchanger 4 where it is heated and converted from its liquid phase to its gaseous phase. Due to the conversion into the gaseous phase the pressure may be increased once more. The pressurized gaseous phase working fluid then streams to the expander device 8, where the thermal energy is converted to mechanical or electrical energy. Mechanical energy can be generated by e.g., a displacement engine (not shown), such as a piston engine, where the pressurized working fluid operates a piston, or may be generated by a turbine (not shown). Alternatively, the expander device 8 may operate a generator (not shown) for generating electrical energy. The pressure of the working fluid is used to displace e.g. the piston or to operate the turbine or the generator. Consequently, the pressure of the working fluid drops so that in the fourth stage IV, the working fluid, has low pressure, even if it is still in its gaseous phase. The low pressure gaseous phase working fluid is subsequently transported to the condenser device 10, where the hot working fluid is cooled below its dew point and thereby converted back into its liquid phase.

The working fluid for such a thermodynamic engine 1 can be a pure liquid e.g. water or alcohol, e.g. ethanol, or ammonia, or a mixture of at least a first component such as e.g., water with a second component, such as e.g. ammonia or ethanol, or even an water-ammonia-ethanol mixture. In case the second component influences the thermodynamic phase transition points of the working fluid, as is the case e.g. with the ammonia-water mixture and/or the ethanol-water mixture, the second component may advantageously be adapted to lower the freezing point of e.g. water so that it serves as anti-freeze protection for the working fluid.

Particularly, for the application in a vehicle, the use of ammonia is advantageous as ammonia or an ammonia compound, namely urea, may already be present in the vehicle. In case the exhaust gas aftertreatment system uses a selective catalytic reduction unit (SCR unit) for reducing NOx compounds in the exhaust gas, urea or ammonia may be used as reduction agent.

However, the use of ammonia and/or alcohol has the drawback that the working fluid cannot be released to the atmosphere as is the case with the use of water. In order to alleviate this problem, the working fluid release means 24 is provided, through which working fluid, e.g. ammonia can be released to the catalytic treatment unit 20 in the exhaust gas after treatment system for a catalytic treatment of the released working fluid.

The working fluid release means 24 is branched off from the high pressure side III of the working fluid circuit 11.

The working fluid release means 24 may serve as safety release or generally as release possibility for the working fluid. A release may be required e.g. in case the pressure in the working fluid circuit 11 exceeds a predetermined pressure threshold, but also e.g. in case of a collision of the vehicle comprising the thermodynamic engine 1. A safe release possibility of the working fluid is also advantageous for maintenance purposes of the thermodynamic engine 1 and/or the vehicle.

It is advantageous to branch off the working fluid release means 24 upstream of the expander device 8 and downstream of the heat exchanger 4, where the highest pressure is to be expected. Since the pressure at the high pressure side is usually higher than the pressure in the exhaust gas duct 18, further means for propelling flow of the working fluid to the exhaust gas duct 18 is not necessary. However, it is also possible to branch off working fluid release means 24 downstream of pump 2 and upstream of the heat exchanger 4 (not shown).

The released working fluid or the released part of the working fluid is subsequently catalytically treated in the exhaust gas after treatment unit 20 and thereby converted into harmless compounds which can be released to the atmosphere. Thereby it should be noted that the location where the part of the working fluid is released into the exhaust gas after-treatment system depends on the type of working fluid. E.g. when ammonia is used, it is preferred to introduce the released working fluid into the exhaust gas after treatment system upstream of the selective catalytic reduction unit. If alcohol is comprised in the working fluid, it is advantageous to release the working fluid into the exhaust gas after treatment system upstream of the oxidation catalyst.

Branching off working fluid release means 24 at the high temperature and high pressure side of the working fluid circuit 11 has the additional advantage that the exhaust gas streaming through the exhaust gas duct 18 is not excessively cooled down so that operation of the exhaust gas after treatment system is not compromised. Typically, the operation temperature for the exhaust gas after treatment system is above 250° Celsius.

Figure 5:
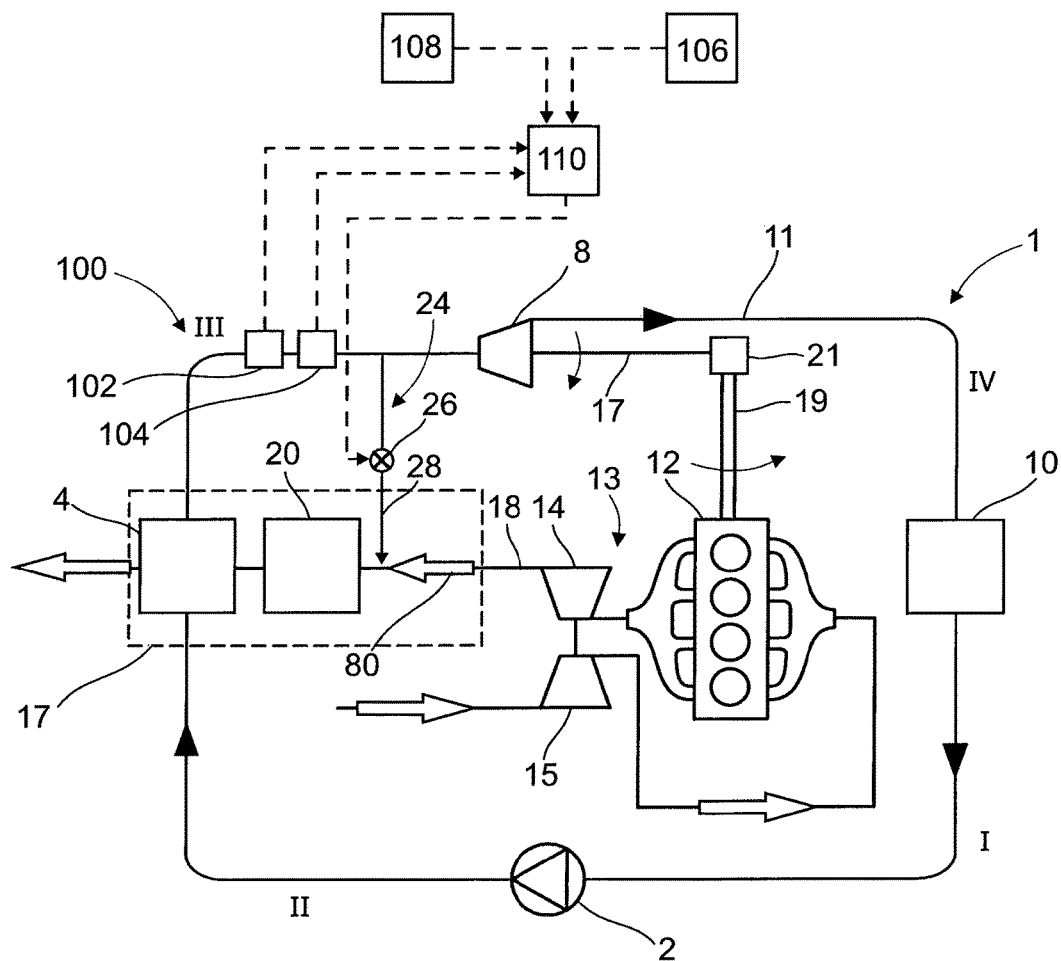

Turning now to FIG. 5, which shows a further development of the embodiment example in FIG. 3. The working fluid release means 24 comprises a connection duct 28, which is branched off from the working fluid circuit 11 and is connected on its other side with the exhaust gas duct 18 upstream of the catalytic exhaust gas after treatment unit 20.

Further, the working fluid release means 24 comprises a valve 26, wherein the valve 26 preferably opens in dependence of e.g. a sensed temperature or a sensed pressure. In this case the valve 26 may be adapted to open if a pressure exceeding a predetermined pressure threshold is sensed at the high pressure side III of the working fluid circuit II. In case a pressure exceeding a predetermined pressure threshold is detected, the valve 26 may open and release at least part of the working fluid to the exhaust gas duct 18. The valves referred to in this application may be normally closed on/off valves, but any other suitable valve is equally useable.

The exhaust gas system 100 comprises a control unit 110, which is operatively connected to the release valve 26 for opening and/or closing the valve 26. The exhaust gas system 100 comprises at least one pressure detector 102 arranged in the working fluid circuit 11. Further, the control unit 110 is operatively connected to the pressure detector 102 for controlling the opening and/or closing of the release valve 26 in dependence on a detected pressure. More specifically, the pressure detector 102 is arranged downstream of the heating device 6 and upstream of a gas-liquid interface in the condensation device 10. Further, the control unit 110 is configured to open the release valve 26 if a pressure exceeding a pressure threshold is detected by means of the pressure detector 102.

Further, the exhaust gas system 100 comprises at least one air sensor 104 for detecting air in the working fluid circuit 11. The control unit 110 is operatively connected to the air sensor 104 for opening the valve 26 upon detection of air accumulation in the working fluid circuit 11.

Further, the exhaust gas system 100 comprises a manually operable means 106, which is connected to the control unit 100 for manually controlling opening and/or closing of the valve 26.

Further, in the embodiment example in FIG. 5, the rotational energy from the expander device 8 is transferred back to the internal combustion engine 12 via a mechanical transmission. More specifically, the expander device 8 is formed by a turbine unit with an output shaft 17. The output shaft 17 is connected to a crankshaft 19 of the internal combustion engine via a transmission unit 21.

Figure 4:
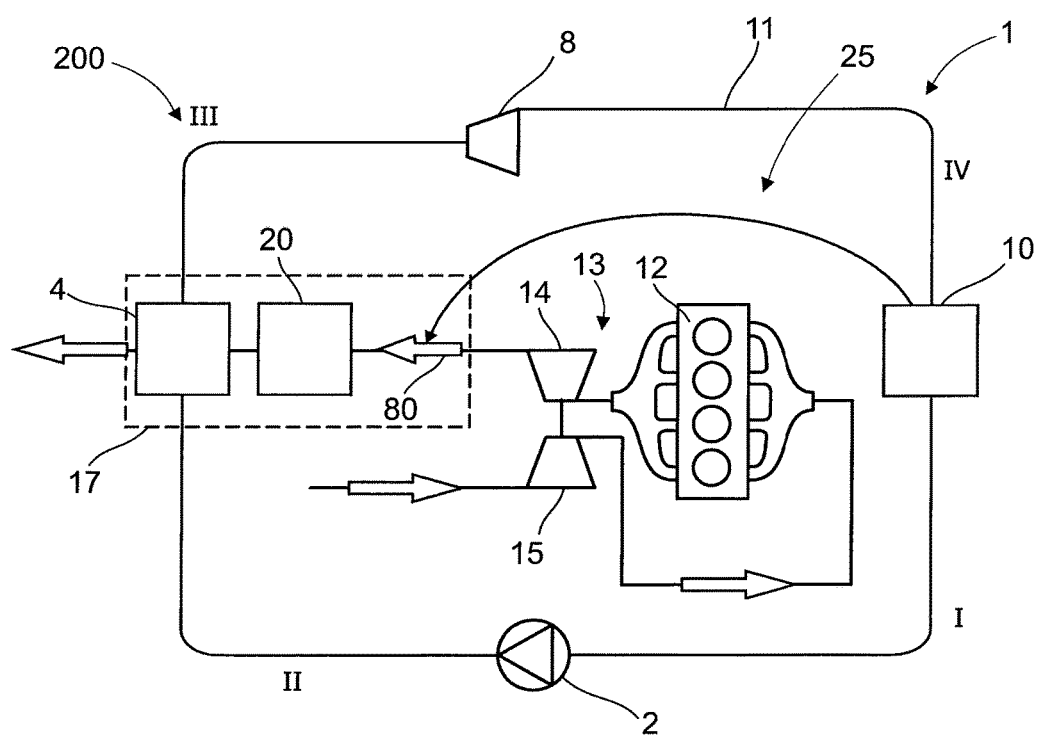

Turning now to FIG. 4, which shows an alternative position of the working fluid release means 25 in relation to the embodiment example shown in FIG. 3. More specifically, the working fluid release means 25 is connected to the working fluid circuit 11 downstream of the heating device 6 and upstream of a gas-liquid interface in the condensation device 10.

More specifically, the working fluid release means 25 is connected to the condensation device 10 and particularly to the gaseous side of the condensation device 10. One advantage of this arrangement is that air which has leaked into the working fluid circuit 11 and accumulates at the gaseous pan of the condensation device 10 can be easily released during shut down or before start up of the thermodynamic engine 1. However, in the preferred embodiment with ammonia or an ammonia mixture as working fluid, the air accumulated in condensation device 10 is also mixed with ammonia. It is therefore preferred to release the accumulated air/ammonia mixture of the condensation device 10 into the exhaust gas duct 18 for further catalytic treatment.

The working fluid release means 25 arranged at the condensation device 10 can also be used as safety release for the working fluid, so that the working fluid release means 24 at the high pressure side in is not necessarily needed.

Figure 6:
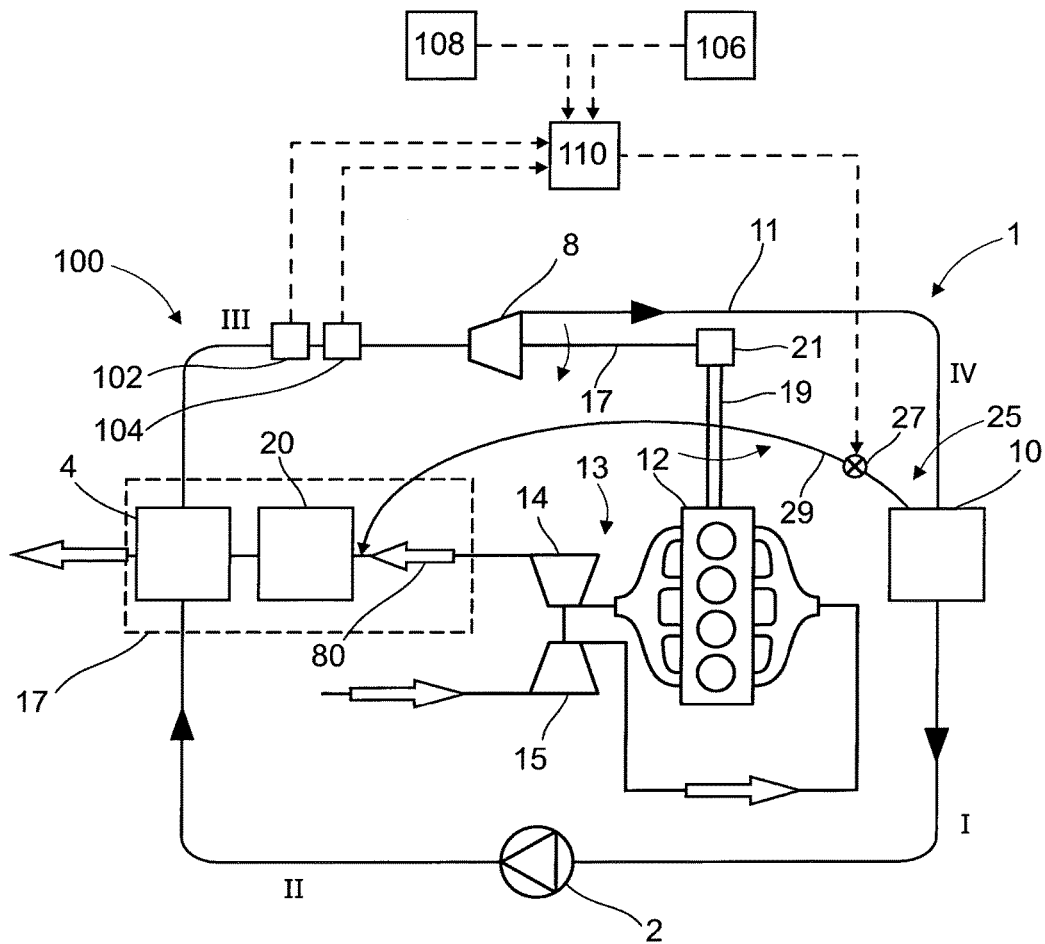

Turning now to FIG. 6, which shows a further development of the embodiment example in FIG. 4. The working fluid release means 25 comprises a connection duct 29, which is branched off from the working fluid circuit 11 and is connected on its other side with the exhaust gas duct 18 upstream of the catalytic exhaust gas after treatment unit 20. Further, the working fluid release means 25 comprises a valve 27, wherein the valve 27 preferably opens in dependence of e.g. a sensed temperature or a sensed pressure.

Figure 7:
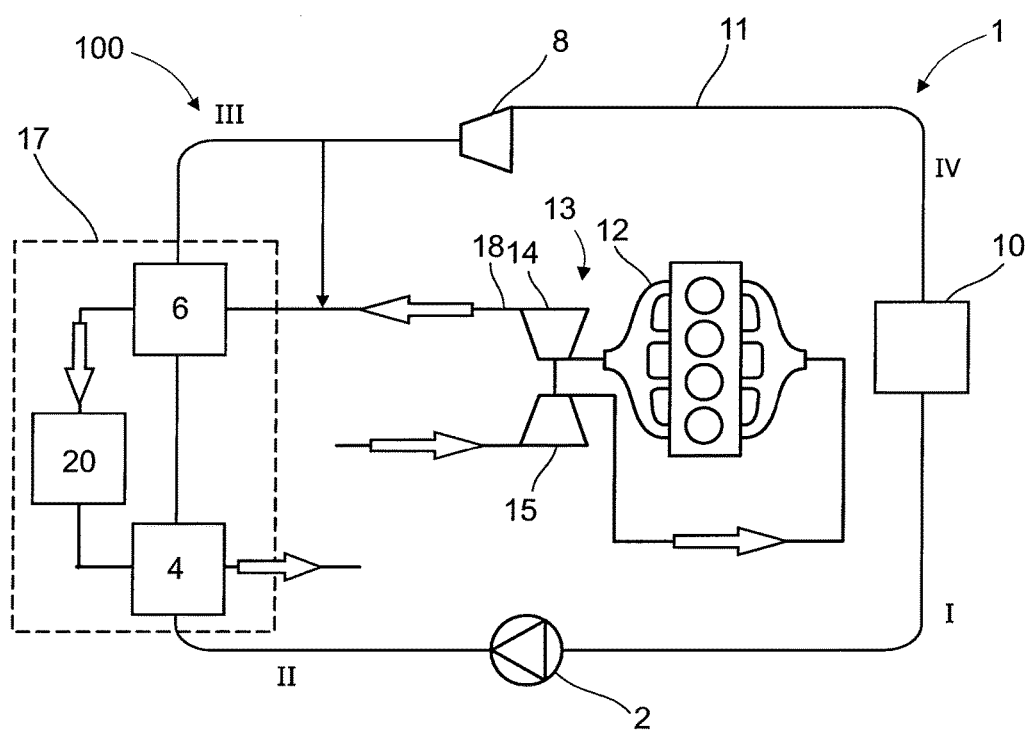

Turning now to FIG. 7, which shows a further development of the embodiment example in FIG. 3. The thermodynamic engine 1 comprises a second heat exchanger 6, which is positioned upstream of the exhaust aftertreatment unit 20 in the exhaust gas stream 80 and in the working fluid circulation circuit 11. More specifically, the second heat exchanger 6 is positioned downstream of the first heat exchanger 4 and upstream the expander device 8 in the working fluid circulation circuit 11. In a system, where at least two heat exchangers are provided the cooling down effect of the second heat exchanger 6 to the exhaust gas is reduced as the working fluid streaming from heat exchanger 4 to heat exchanger 6 is already preheated.

Figure 8:
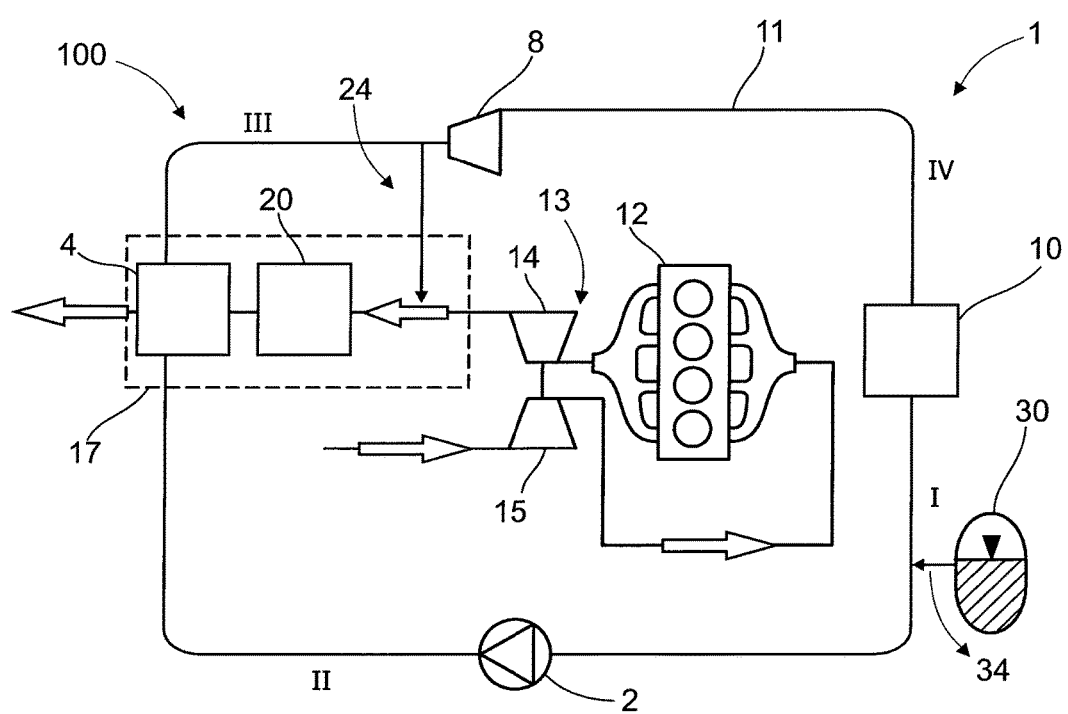

Turning now to FIG. 8, which shows a further development of the embodiment example in FIG. 3. The exhaust gas system 100 comprises a working fluid storage tank 30, which is fluidly connected to the working fluid circuit 11 for storing liquid working fluid. Since the working fluid is releasable through the working fluid release means 24, the working fluid storage tank 30, e.g. an expansion tank, is configured for replacing released working fluid in the working fluid circuit 11. More specifically, the working fluid storage tank 30 is fluidly connected to a low pressure side, see stage I and IV, of the working fluid circuit 11. More specifically, the working fluid storage tank 30 is connected to the working fluid circuit 11 downstream of the condensation device 10 and upstream of the heating device 4.

In principle, arranging the working fluid storage tank 30 at the low pressure side I of the working fluid circuit 11 allows an energy saving working fluid supply as the working fluid needs not to be forced into the working fluid circuit 11. In the depicted embodiments, the working fluid storage tank 30 is an expansion tank. Consequently, the working fluid storage tank 30 may be fluidly connected to the working fluid circuit 11 only by means of a connection 34. A valve or pump is not necessary. Due to the open connection between working fluid circuit 11 and working fluid storage tank 30, fluctuations in the working fluid may be balanced.

Figure 10:
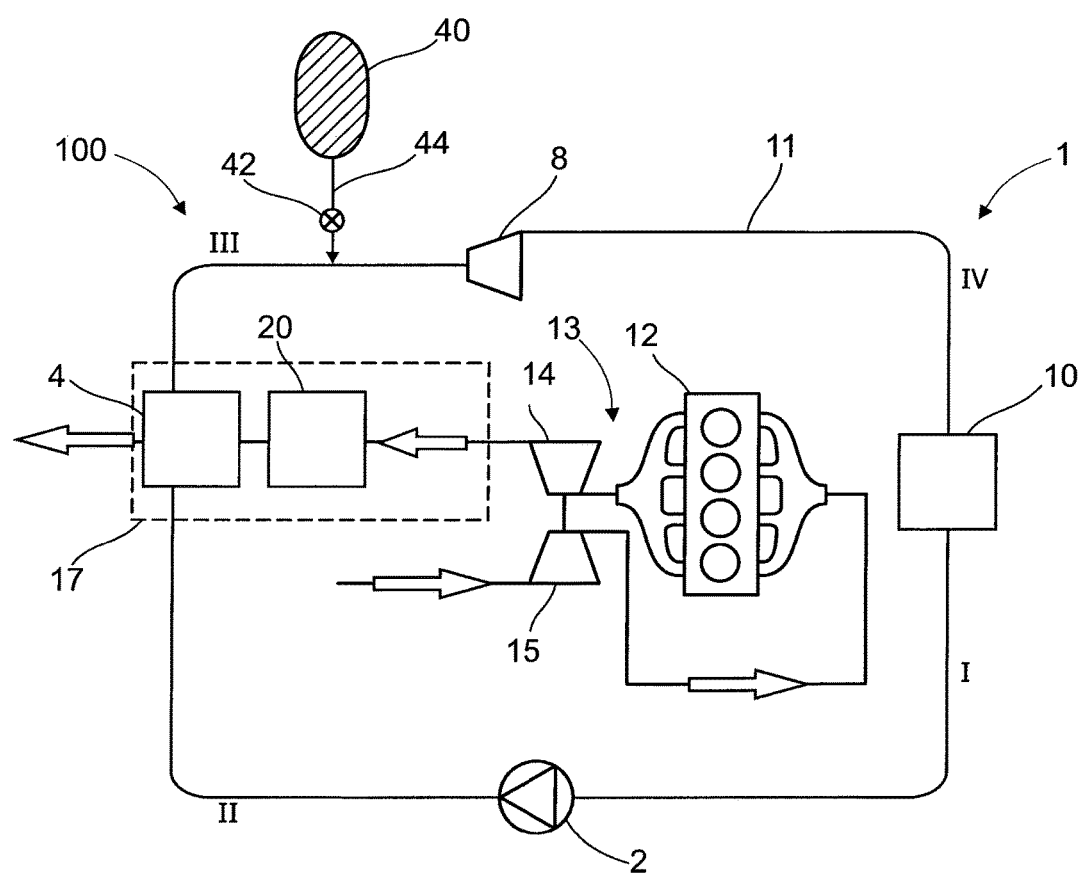

Turning now to FIG. 10, which shows an alternative positioning of the working fluid storage tank 40 in relation to the embodiment example in FIG. 8. More specifically, the working fluid storage tank 40 is fluidly connected to a high pressure side, see stage II and III, of the working fluid circuit 11. More specifically, the working fluid storage tank 40 is connected to the working fluid circuit 11 downstream of the heating device 4 and upstream of the expander device 8. The exhaust gas system 1.00 comprises a working fluid storage tank valve 42 configured to control working fluid flow between the working fluid storage tank 40 and the working fluid circuit 11. The exhaust gas system 100 further comprises a working fluid storage tank conduit 44, which fluidly connects the working fluid storage tank 40 with the working fluid circuit 11. The working fluid storage tank valve 42 is positioned in the conduit 44.

The ammonia reservoir 40 may be pressurized to a pressure above the pressure present at the high pressure side III or, alternatively, the ammonia may be transported to the working fluid circuit by means of a pump (not shown).

As mentioned above, the leaking in of air is, besides the freezing out of the main disadvantages of the known thermodynamic engines. Particularly during standstill, the high pressure side III may cool down to such a degree that the pressure drops below ambient air pressure. This results in air leaking into the working fluid circuit II which in turn compromises the efficiency of the thermodynamic engine 1. Additionally, air, particularly in the form of bubbles or cavities can be rather aggressive to the construction materials of the thermodynamic engine parts.

Since the problem of air leaking in arises only during cool down and when the pressure drops below ambient pressure, the valve 42 (see FIG. 10) arranged in the connection duct 44 between the ammonia reservoir 40 and the working fluid circuit 11 can be opened in dependence of a detected pressure drop or engine operation status so that additional ammonia may stream into the working fluid circuit 11. Thereby, the pressure in the working fluid circuit 1 can be increased to a level around ambient air pressure, which prevents air from leaking in.

At startup of the thermodynamic engine 1, the surplus of working fluid can again be released through the working fluid release means 24.

Besides the above discussed possibility to flood the working fluid circuit 11 with working fluid during cool down and thereby preventing air from leaking in, the provision of the ammonia reservoir 40 enables an adaptation of the ammonia concentration in the working fluid to the local climate and/or a sensed ambient temperature. Advantageously, at cold temperatures a high ammonia concentration can be used as anti-freeze protection so that an increased ammonia amount during cold temperatures, i.e. during wintertime, is provided, wherein at higher temperatures a lower ammonia concentration is provided so that the condenser can operate at higher temperatures.

Preferably, the ammonia concentration can be adapted on a daily, weekly and/or a monthly basis depending on the expected temperature variations. Of course it is also possible to adapt the ammonia concentration on a shorter time scale or an even longer time scale, Turning now to FIG. 11, which shows an alternative positioning of the we fluid storage tank 40 in relation to the embodiment example in FIG. 10. More specifically, the working fluid storage tank 40 is connected to the working fluid circuit 11 downstream of the expander device 8 and upstream of the condensation device 10. In a similar vein as has been described above for FIG. 10, the exhaust gas system 100 comprises a working fluid storage tank valve 46 and a working fluid storage tank conduit 48.

Arranging the ammonia reservoir 40 at the low pressure side IV of the working fluid circuit 11, allows for the supply of ammonia during standstill or shut down of the thermodynamic engine 1, when the high pressure side III of the working fluid circuit is not pressured. In doing so the system can be prevented from air leaking into the working fluid circuit 11 during standstill of the thermodynamic engine 1.

Figure 11:
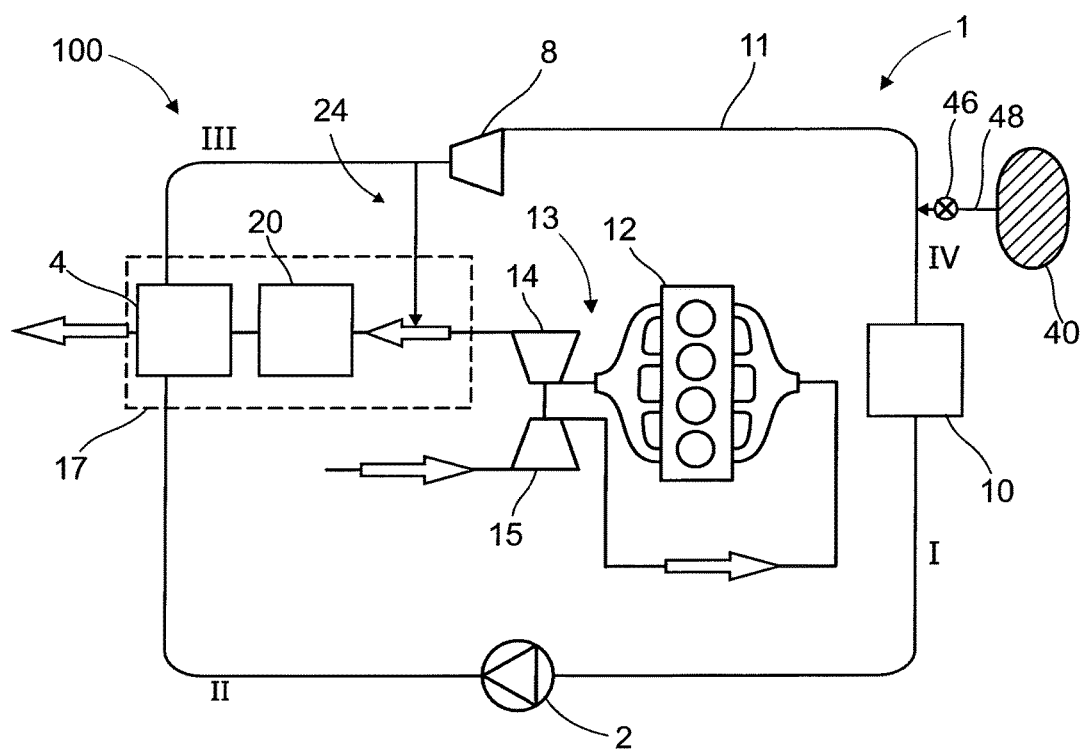

As shown in the embodiment of FIG. 11 it is also possible to arrange the ammonia reservoir 40 cm the high temperature side of the low pressure side IV, namely upstream of the condensation device 10 of the working fluid circuit 11. This has the advantage that the supply of ammonia already cools the gaseous phase of the working fluid so that energy for cooling off the working fluid can be saved. Additionally, working fluid release means 25 may be arranged between the condensation device 10 and the exhaust gas duct 18 (see FIG. 4).

Figure 12:
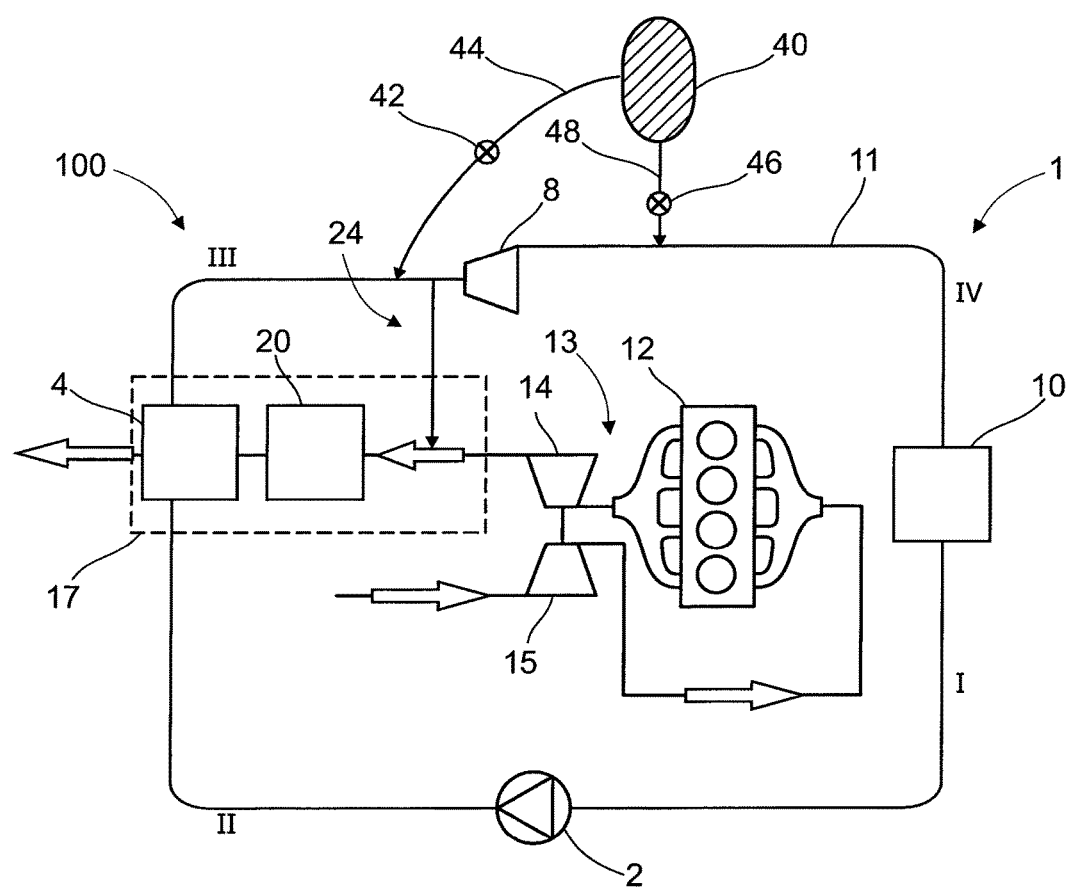

Turning now to FIG. 12, which shows an alternative arrangement of the working fluid storage tank 40 in relation to the embodiment examples in FIGS. 10 and 11. More specifically, the working fluid storage tank 40 is connected to the working fluid circuit 11 downstream of the heating device 4 and upstream of the expander device 8 via the conduit 44 and connected to the working fluid circuit 1 downstream of the expander device 8 and upstream of the condensation device 10 via the conduit 48.

Thus, the ammonia reservoir 40 is connected both to the high pressure side III of the working fluid circuit 11 and to the low pressure side IV of the working fluid circuit 11. Both conduits 44 and 48 may be provided with valves 42 and 46, which control the feeding of ammonia to the working fluid circuit 11. Having a connection to both the low pressure side IV and the high pressure side III of the working fluid circuit 11 allows for feeding ammonia or an ammonia mixture during standstill and during operation of the working fluid circuit 11.

Figure 9:
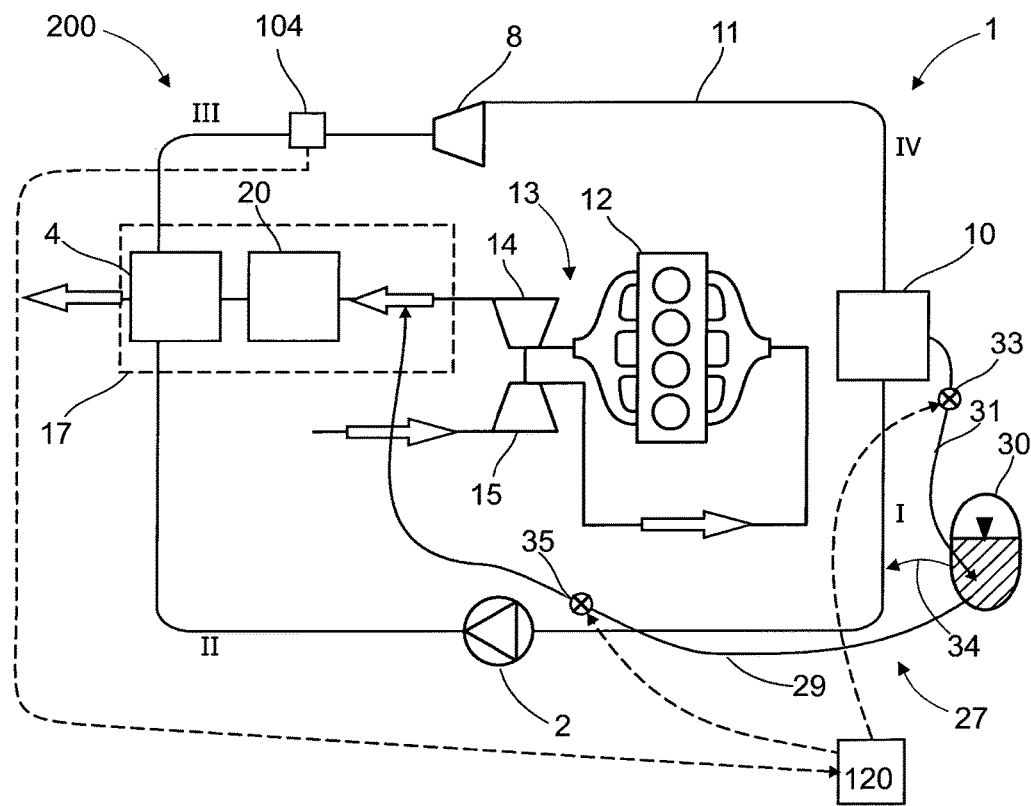

Turning now to FIG. 9, which shows a combination of the working fluid release from the condensation device 10 in FIG. 4 and the arrangement of the working fluid storage tank 30 in FIG. 8. As mentioned above, in case of a working fluid containing ammonia, the air in condensation device 10 may be mixed with working fluid and therefore also with ammonia. Thus, direct release of the working fluid-air-mixture into the exhaust gas duct 18 may be regarded as waste of working fluid. As shown in FIG. 9 the working fluid-air-mixture of condensation device 10 is guided through the working fluid storage tank 30, whereby at least part of the working fluid in the working fluid-air-mixture is cooled and converted to liquid working fluid which remains in the working fluid storage tank 30. At the best, all working fluid is thereby removed from the working fluid-air-mixture so that only air is transported off.

The second component is ammonia in the illustrated embodiments Even if it is not explicitly depicted in the Figures, it should be noted that the exhaust gas after treatment system itself may serve as ammonia storage as it is able to store, particularly at ambient temperatures, large amounts of ammonia, which may be used later on during operation of the internal combustion engine as reduction agent.

FIGS. 10-12 depict embodiment examples, which are in particular preferred for the use of ammonia or an ammonia mixture as working fluid. However, it should be explicitly mentioned that even if in the following the reservoir is referred to as ammonia reservoir, the reservoir may contain other fluids or components, such as e.g. any other second component which may serve as anti-freeze component for the working fluid. Additionally, the reservoir may also serve as working fluid storage tank, although it is then usually not designed as expansion tank.

Figure 13:
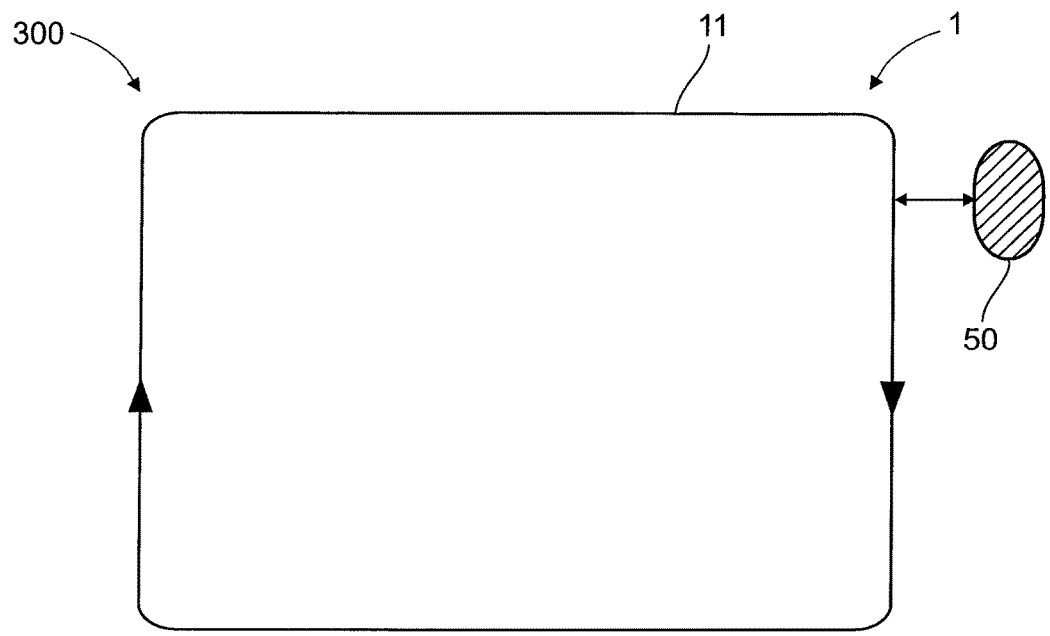

FIG. 13 shows a further embodiment example of an exhaust gas system 300 preferably for being used m conjunction with the internal combustion engine 12. The exhaust gas system 100 comprises a thermodynamic engine 1, which comprises a working fluid circulation circuit 11, wherein the working fluid comprises an antifreeze component. The exhaust gas system 300 comprises at least one reservoir 50 for the, antifreeze component, wherein the at least one reservoir 50 is fluidly connected to the working fluid circuit 11 for regulating a concentration of the antifreeze component of the working fluid in the working fluid circuit 11.

The embodiment example of FIG. 13 forms an alternative to the embodiment examples of FIGS. 2-12, which all are configured to release surplus ammonia to the exhaust gas stream. Instead, the embodiment example of FIG. 13 is configured to release the surplus ammonia to the ammonia collector 50.

Figure 16:
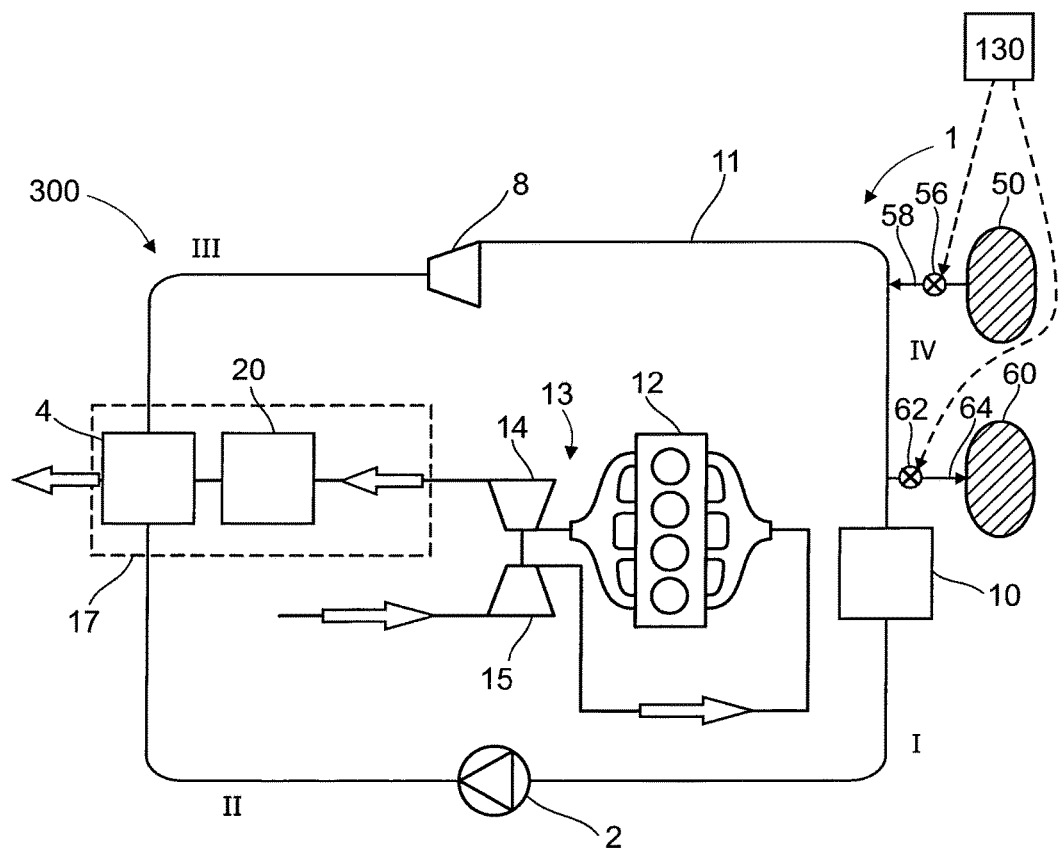

Analogous to the above-mentioned reservoir 40, also the collector 50 may be connected to the working fluid circuit 11 by means of a connection duct 58 and a valve 56, see FIG. 16.

The reservoir 50 is configured for collecting working fluid released from the working fluid circuit 11, which is cooled and/or prevented from being heated.

The ammonia supply and collection may be performed as follows. The ammonia reservoir 50 may be heated to a temperature where the ammonia in the reservoir 50 has a pressure above ambient air pressure. This temperature depends on the used ammonia or ammonia compound. For example if the reservoir 50 contains an ammonia adsorbing material, such as CaCl2) MgC and/or SrCl2, the reservoir 50 needs to be heated to a temperature around 40° Celsius so that the pressure of the ammonia inside the reservoir 50 is above circa 1 bar (ambient air pressure).

Figure 14:
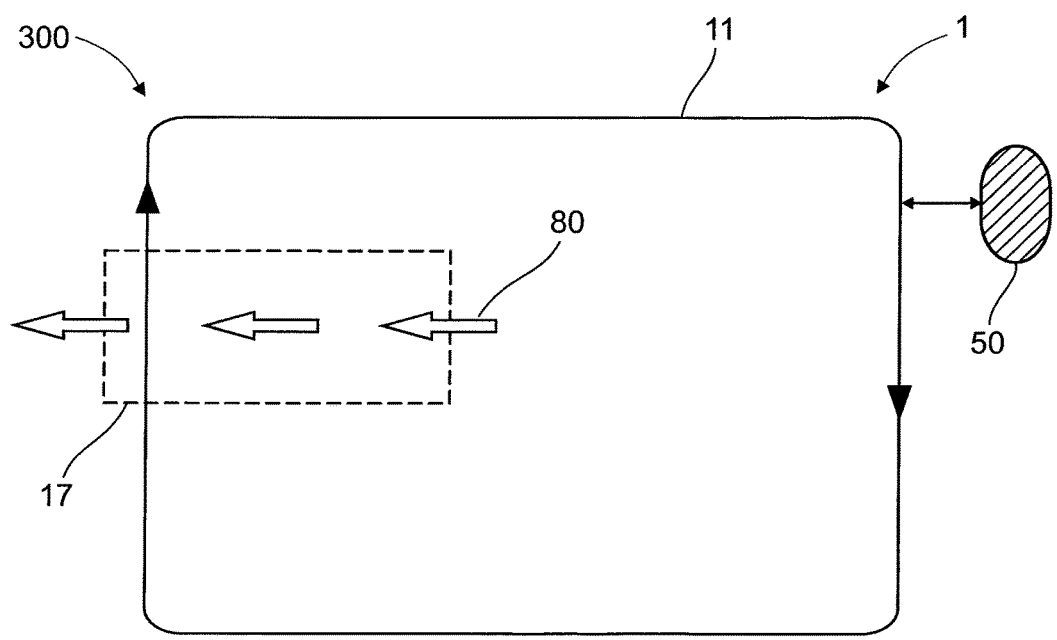

Turning now to FIG. 14, which shows a further development of the embodiment example of FIG. 13. The exhaust gas system 300 comprises an arrangement 17 for conveying an exhaust gas stream 80 as described above. The thermodynamic engine 1 is connected to the exhaust gas stream conveying arrangement 17 for recovery of heat from the exhaust gas stream 80.

Figure 15:
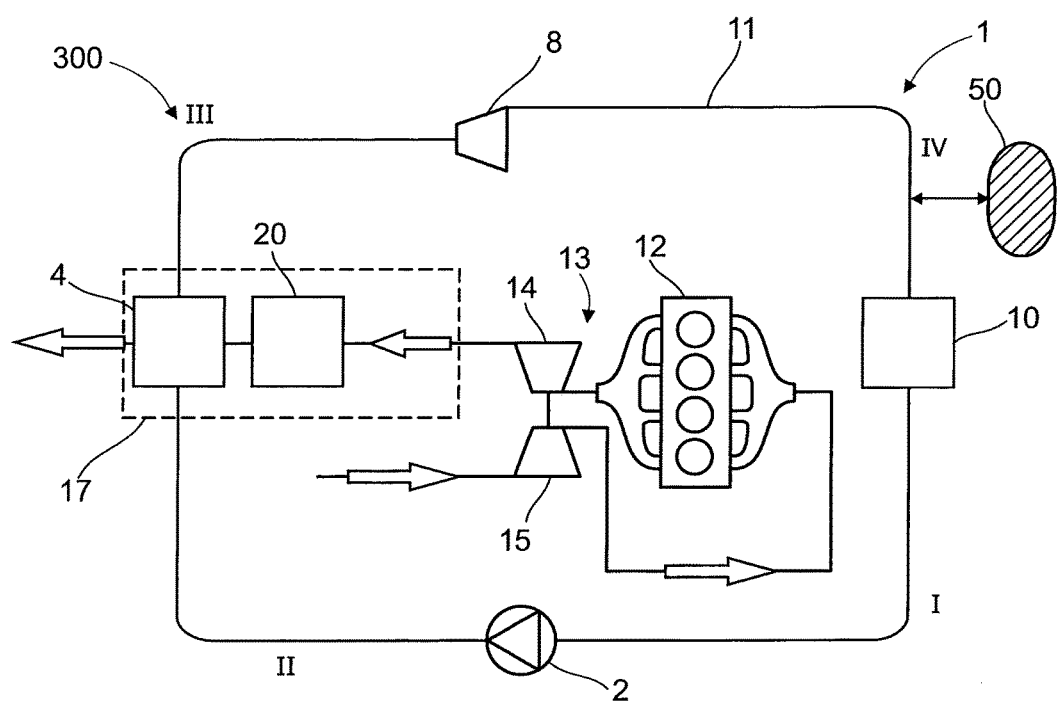

Turning now to FIG. 15, which shows a further development of the embodiment example of FIG. 14. The exhaust gas system 300 is similar to the one described above for FIG. 3, but with the difference that there is no working fluid release means.

The exhaust gas stream conveying arrangement 17 comprises an exhaust gas after treatment unit 20 as described above.

Turning now to FIG. 16, which shows a further development of the embodiment example of FIG. 15. The exhaust gas system 300 comprises two reservoirs 50, 60, which are fluidly connected to the working fluid circulation circuit 11. The additional reservoir 60 forms a collector. The release of ammonia from the working fluid circuit 11 to the ammonia collector 60 works the same way but in contrast to the heated ammonia reservoir 50, the ammonia collector 60 is cooled or kept cool so that also a pressure difference between the working fluid circuit 11 and the ammonia collector 60 is provided.

Figure 17:
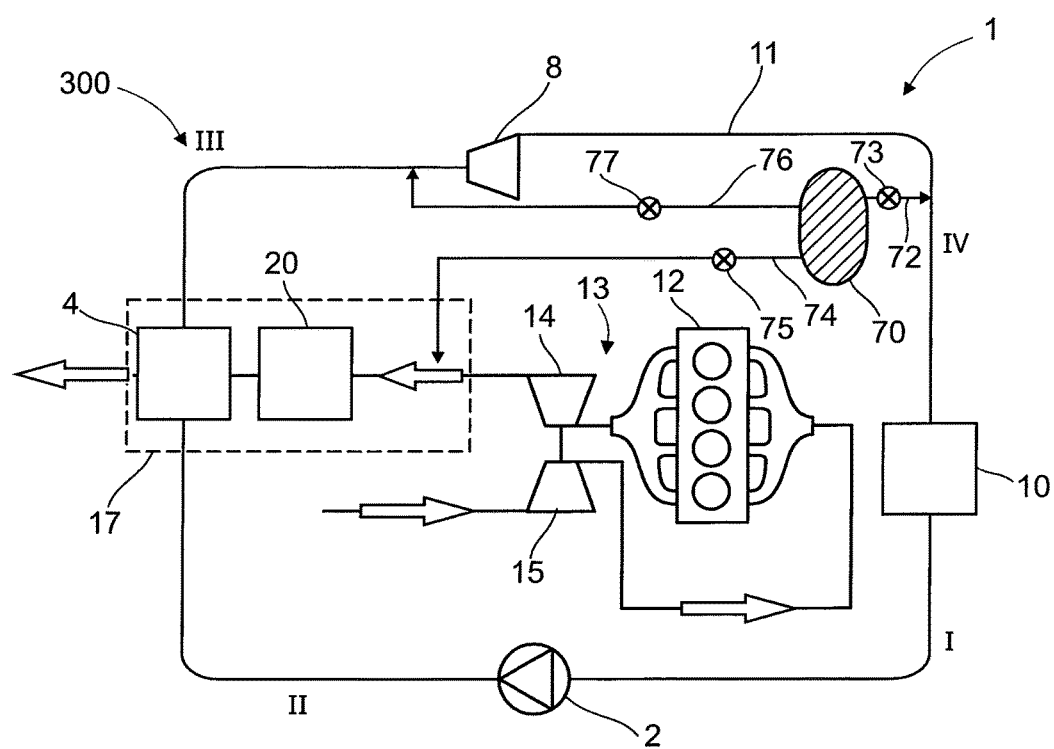

Turning now to FIG. 17, which shows a further development of the embodiment example of FIG. 16. Instead of using both an ammonia reservoir 50 and a collector 50, the exhaust gas system comprises a single reservoir 70 which is connected to the various parts of the working fluid circuit 11. As shown in the embodiment example of FIG. 17 such an arrangement is particularly preferred if the exhaust gas after treatment system of the vehicle works with ammonia as reduction agent for the selective catalytic reduction of NOx. The ammonia reservoir 70 may also provide the reduction agent to the exhaust gas after treatment system. In this case, ammonia is preferably provided in the form of urea as area is an easily handled substance and already often used in vehicles equipped with exhaust gas aftertreatment systems.

The above described embodiment examples are exemplary only and it should be explicitly noted that any other combinations of the shown embodiments are also possible.

The working fluid storage tank 30 and/or at the at least one reservoir 40 may further comprise a heater for heating the working fluid.

It is to be understood that the present invention is not limited to the embodiments described above and illustrated in the drawings; rather, the skilled person will recognize that many changes; and modifications may be made within the scope of the appended claims.

For example, even if not shown in the Figures, instead of using the waste heat of the exhaust gas of the internal combustion engine 12 (as shown in the Figures) also the heat of a cooling fluid for the combustion engine 12 can be used for the thermodynamic engine 1.

Further, the different embodiment examples shown in the drawings and described above may be combined in different ways. For example, the position of the working fluid tank 30 in FIG. 8 may be combined with the embodiment example shown in FIG. 4, wherein the working fluid storage tank 30 remains at the low pressure side of the working fluid circuit 11 and wherein the working fluid release means 25 is connected to the low pressure side I, IV.

According to a farther example, arrangement of the working fluid release means 24 at the high pressure side III (see FIG. 3) may be combined with arrangement of working fluid release means 25 connected to the low pressure side I, IV (see FIG. 4). Even if the working fluid release means 25 may be used as safe release possibility of the working fluid, it may be advantageous to provide both the working fluid release means 24 at the high pressure side III for a safety release during operation and a quick reduction of the high pressure and the working fluid release means 25 at the low pressure side I; IV for the removal of accumulated air from the condensation device 10.

The invention claimed is:

1. An exhaust gas system comprising:
   an exhaust gas conveying arrangement for conveying an exhaust gas stream,
   a thermodynamic engine connected to the exhaust gas stream conveying arrangement for recovery of heat from the exhaust gas stream, the thermodynamic engine comprising a working fluid circulation circuit, at least one working fluid release means, which is connected between the working fluid circulation circuit and the exhaust gas conveying arrangement for releasing the working fluid from the working fluid circulation circuit to the exhaust gas conveying arrangement, the exhaust gas stream conveying arrangement comprising at least one exhaust gas treatment unit, wherein the working fluid release means is connected upstream of or directly to the exhaust gas treatment unit and comprises a connecting duct and at least one release valve for controlling opening and/or closing of the connecting duct, wherein the exhaust gas system comprises a control unit which is operatively connected to the release valve for opening and/or closing the valve, wherein the exhaust gas system comprises at least one pressure detector arranged in the working fluid circuit and that the control unit is operatively connected to the pressure detector for controlling the opening and/or closing of the release valve in dependence on a detected pressure, wherein:

the control unit is configured to open the release valve if a pressure exceeding a pressure threshold is detected by means of the pressure detector, and/or the control unit is operatively connected to a collision warning system detecting a potential collision and/or a collision detection unit detecting a collision, and configured to open the release valve upon detection of a risk for a collision or a collision.

2. Exhaust gas system according to claim 1, wherein the exhaust gas treatment unit is formed by a selective catalytic reduction unit (SCR) using ammonia for reducing a NOx amount of the exhaust gas.

3. Exhaust gas system according to claim 2, wherein the thermodynamic engine further comprises a heating device for heating the working fluid and thereby converting a liquid working fluid to the gaseous phase working fluid, and wherein the pressure detector is arranged downstream of the heating device and upstream of a gas-liquid interface in the condensation device.

4. Exhaust gas system according to claim 1, wherein the thermodynamic engine comprises a condensation device positioned in the working fluid circulation circuit and that the working fluid release means is connected to the condensation device at a gas side thereof.

5. Exhaust gas system according to claim 4, wherein the thermodynamic engine further comprises a heating device for heating the working fluid and thereby converting a liquid working fluid to the gaseous phase working fluid, and wherein the working fluid release means is connected to the working fluid circuit downstream of the heating device and upstream of a gas-liquid interface in the condensation device.

6. Exhaust gas system according to claim 4, wherein the thermodynamic engine further comprises a heating device for heating the working fluid and thereby convening a liquid working fluid to the gaseous phase working fluid, and wherein the thermodynamic engine further comprises a pump device for circulating the working fluid; an expander device for converting thermal energy of the gaseous phase working fluid into kinetic energy; and that the condensation device is arranged downstream of the expander device for cooling and thereby converting the gaseous phase working fluid into the liquid phase.

7. Exhaust gas system according to claim 1, wherein the thermodynamic engine further comprises a heating device for heating the working fluid and thereby converting a liquid working fluid to the gaseous phase working fluid.

8. Exhaust gas system according to claim 7, wherein the heating device of the thermodynamic engine is formed by a heat exchanger positioned in the exhaust gas stream for exchanging heat between the exhaust gas stream and the working fluid of the thermodynamic engine.

9. Exhaust gas system according to claim 7, wherein the heating device of the thermodynamic engine is arranged downstream of the exhaust gas treatment unit in the exhaust gas stream.

10. Exhaust gas system according to claim 1, wherein the exhaust gas system comprises at least one air sensor for detecting air in the working fluid circuit, that the control unit is operatively connected to the air sensor for opening the valve upon detection of air accumulation in the working fluid circuit.

11. Exhaust gas system according to claim 1, wherein the exhaust gas system comprises a manually operable means, which is connected to the control unit for manually controlling opening and/or closing of the valve.

12. Exhaust gas system according to claim 1, wherein the exhaust gas system comprises a working fluid storage tank fluidly connected to the working fluid circuit for storing liquid working fluid.

13. Exhaust gas system according to claim 12, wherein the working fluid storage tank is fluidly connected to a low pressure side of the working fluid circuit.

14. Exhaust gas system according to claim 13, wherein the thermodynamic engine comprises a condensation device positioned in the working fluid circulation circuit and that the working fluid storage tank (30) is connected to the working fluid circuit downstream of the condensation device and upstream of the heating device.

15. Exhaust gas system according to claim 12, wherein the working fluid storage tank is fluidly connected to a high pressure side of the working fluid circuit.

16. Exhaust gas system according to claim 12 wherein the exhaust gas system comprises a working fluid storage tank valve configured to control working fluid flow between the working fluid storage tank and the working fluid circuit.

17. Exhaust gas system according to claim 16, wherein the working fluid storage tank valve is connected to the control unit in order to open if a pressure below ambient air pressure is detected in the working fluid circuit.

18. Exhaust gas system according to claim 1, wherein the working fluid comprises an antifreeze component.

19. A vehicle comprising an internal combustion engine wherein the vehicle comprises an exhaust gas system according to claim 1, which exhaust gas system is connected to the internal combustion engine.

20. An exhaust gas system comprising:

a thermodynamic engine, wherein the thermodynamic engine comprises a working fluid circulation circuit, wherein the working fluid comprises an antifreeze component, at least one reservoir for the antifreeze component, wherein the at least one reservoir is fluidly connected to the working fluid circuit for regulating a concentration of the antifreeze component of the working fluid in the working fluid circuit, an exhaust gas stream conveying arrangement for conveying an exhaust gas stream and that the thermodynamic engine is connected to the exhaust gas stream conveyingarrangement for recovery of heat from the exhaust gas stream, the exhaust gas stream conveying arrangement comprising an exhaust gas aftertreatment unit,
wherein the exhaust gas after treatment unit and the working fluid circulation circuit of the thermodynamic engine are connected to a common reservoir of the at least one reservoir, wherein the exhaust gas system comprises a connection duct which connects the at least one reservoir and the working fluid circulation circuit and/or a valve for regulating a concentration of the antifreeze component of the working fluid in the working fluid circuit, and wherein the exhaust gas system comprises a controller configured to control the concentration of the antifreeze component by opening and/or closing a reservoir valve in accordance to a sensed ambient temperature.

21. Exhaust gas system according to claim 20, wherein the exhaust gas treatment unit is formed by a selective catalytic reduction unit (SCR) using ammonia for reducing a NOx amount of the exhaust gas.

22. Exhaust gas system according to claim 20, wherein the thermodynamic engine comprises a pump device for circulating the working fluid; a heating device for heating the working fluid and thereby converting a liquid working fluid to the gaseous phase working fluid, an expander device for convening thermal energy of the gaseous phase working fluid into kinetic energy; a condensation device for cooling and thereby converting the gaseous phase working fluid into the liquid phase.

23. Exhaust gas system according to claim 22, wherein the reservoir for the antifreeze component is connected to the working fluid circuit downstream of the expander device and upstream of the condensation device.

24. Exhaust gas system according to claim 20, wherein the exhaust gas system comprises at least one collecting reservoir, which is connected to the working fluid circuit for collecting working fluid released from the working fluid circuit.

* * * * *